April 28, 1925.
O. GODDU
CANDY SCOOP
Filed June 27, 1924
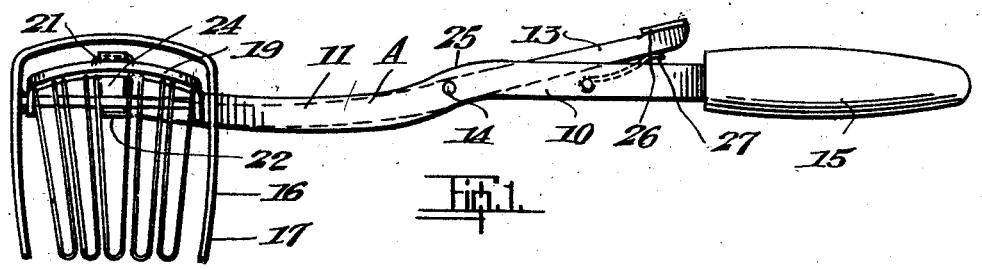
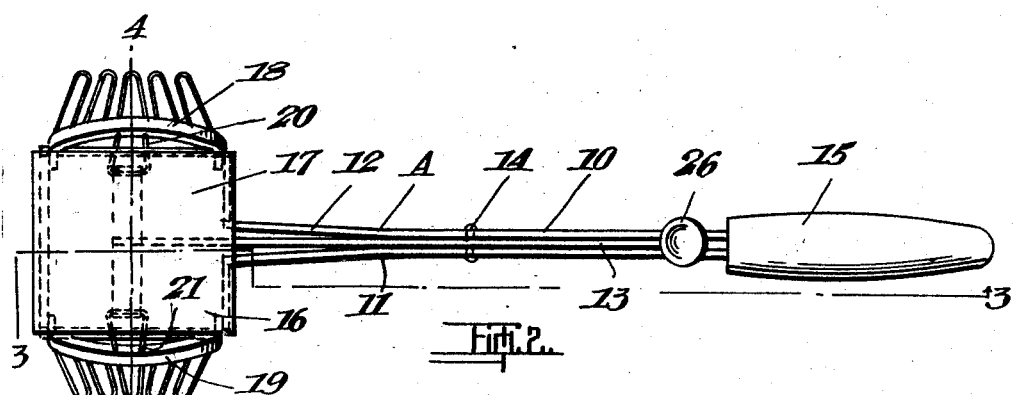
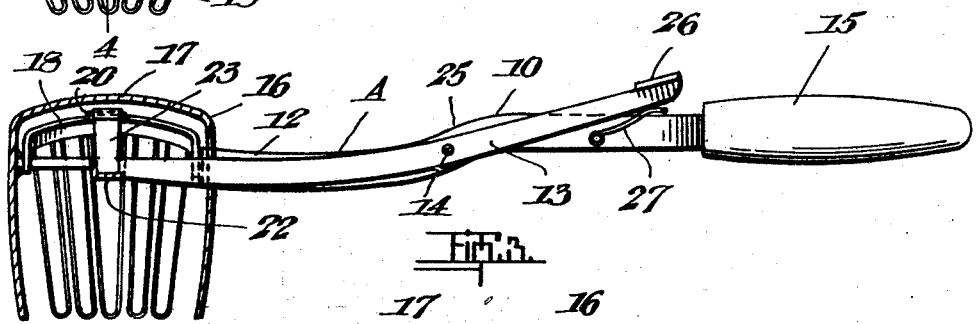
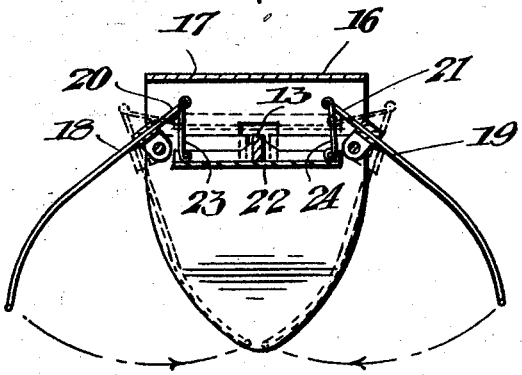
INVENTOR
ONILA. GODDU.

Patented Apr. 28, 1925.

1,535,600

UNITED STATES PATENT OFFICE.

OVILA GODDU, OF PONTEIX, SASKATCHEWAN, CANADA.

CANDY SCOOP.

Application filed June 27, 1924. Serial No. 722,845.

*To all whom it may concern:*

Be it known that I, OVILA GODDU, a subject of the King of Great Britain, and resident of Ponteix, in the Province of Saskatchewan and Dominion of Canada, have invented certain new and useful Improvements in Candy Scoops, of which the following is a specification.

This invention relates to improvements in candy scoops, and the objects of the invention are to provide a candy scoop that will efficiently take up candy or the like from platters and automatically drop it where required.

With candy scoops at present in use the candy is pushed from one platter to the other and mixed, and it is to overcome this disadvantage that I have provided the improved candy scoop hereinafter more fully described, illustrated and claimed.

With the foregoing and other objects in view, the invention consists essentially of a pair of lever-operated gripping members pivotally mounted in a scoop member and provided with means for automatically causing the lever to assume a normal position holding the gripping members open to drop the contents of the scoop into a scales or the like.

Referring now to the drawings, in which like characters of reference indicate corresponding parts in each figure:

Figure 1 is a side elevation.

Figure 2 is a top plan view.

Figure 3 is a section on the line 3—3 of Figure 2.

Figure 4 is an enlarged section on the line 4—4 of Figure 2.

In the drawings, A designates the device as a whole comprising a handle portion 10 longitudinally split or, as here shown, formed of two elements 11 and 12 suitably connected in spaced relationship to one another to permit of the operation therebetween of a lever member 13 mounted therein at 14, the outer end of the handle member being provided with a suitable casing 15 to form handling means, the inner ends of the handle elements 11 and 12 being bent at right angles to carry a frame or bracket 16 substantially rectangular in form and provided on the top and two sides with a metal sheeting 17 extending downwardly therebeyond in pointed formation, the whole forming, with back and front closed sides, a holder member, in the open sides of which and pivotally mounted on the sides of the frame 16 are a pair of gripping jaws 18 and 19. These gripping jaws are pivotally connected, by means of loops 20 and 21 formed integral with the bases thereof, to a transversely extending arm 22 carried on the end of the lever arm or member 13, the loops 20 and 21 being connected to the arm 22 by pivotally mounted links 23 and 24. The members forming the handle, it should be noted, are also formed with an offset 25 adjacent to which the operating lever arm 13, similarly offset, is pivotally mounted. It will thus be seen that on pressure being exerted on the outer end of the lever arm 13 through a button 26 formed thereon the arm 22 will be raised, drawing the gripping members 18 and 19 inwardly together. In order that the gripping jaws 18 and 19 may automatically open by the lever 13 and the arm 22 carried thereby assuming a normal position automatically, I provide a spring 27 in the handle connected at one end to the handle 10 and extending upwardly to press against the lever arm 13 adjacent the outer end thereof so that this arm is retained continually in an upward position with the result that the gripping members are also retained in a normally open position, and that to close them it is only necessary to press the button member 26.

The operation of my device will therefore be seen to be as follows: Holding the handle 10 and pressing the button 26 with the thumb, the gripping jaws 18 and 19 are closed, then, as the pressure is gradually released from the button member 26 the spring 27 on the handle causes the jaws to automatically open and drop the candy or otherwise where desired.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. A candy scoop comprising pivotally mounted gripping jaws, a handle, a lever arm pivotally mounted in said handle and operatively connected to the gripping jaws, and spring means carried by the handle adapted to exert upward pressure on the lever arm to automatically retain the gripping jaws in an open position.

2. A candy scoop comprising a handle and a scoop on said handle, pivotally mounted jaws for the scoop, a pivotally mounted lever arm formed with an operating button at one end and a cross piece at the other end pivotally connected to said jaws whereby, on the button being pressed, the jaws are closed, the cross arm is raised to draw the jaws together, spring means carried by the handle adapted to cause the lever arm to automatically assume a normal position in which the gripping jaws are open.

3. The device as claimed in claim 2 in which the handle and the lever arm are formed with an offset substantially midway of their length.

4. In a device of the character described and in combination with a handle adapted to carry a candy scoop or the like, pivotally mounted jaws for the scoop and a pivotally mounted lever operatively connected to said jaws carried by the handle, and spring means for said lever adapted to cause the jaws to be held normally in an open position.

5. In a device of the character described, the combination with a handle and a pair of pivotally mounted gripping jaws, of a spring-actuated lever arm carried by the handle and pivotally connected to said jaws whereby, on the pressure being released, the lever arm automatically assumes a normal position holding the jaws open.

In witness whereof I have hereunto set my hand in the presence of two witnesses.

OVILA GODDU.

Witnesses:
NAPOLÉON CARIGNAN,
WILFRED GIROUX.